(12) United States Patent
Rodgers et al.

(10) Patent No.: US 7,660,086 B2
(45) Date of Patent: Feb. 9, 2010

(54) PROGRAMMABLE ELECTROSTATIC DISCHARGE (ESD) PROTECTION DEVICE

(75) Inventors: Thurman John Rodgers, Woodside, CA (US); Babak Taheri, San Francisco, CA (US); Dan Zupcau, Starkville, MS (US)

(73) Assignee: Cypress Semiconductor Corporation, San Jose, CA (US)

( * ) Notice: Subject to any disclaimer, the term of this patent is extended or adjusted under 35 U.S.C. 154(b) by 116 days.

(21) Appl. No.: 11/422,926

(22) Filed: Jun. 8, 2006

(65) Prior Publication Data

US 2007/0285854 A1    Dec. 13, 2007

(51) Int. Cl.
 *H02H 3/22* (2006.01)
(52) U.S. Cl. .................................. 361/56; 361/111
(58) Field of Classification Search ............. 361/56–58, 361/111, 91.1
See application file for complete search history.

(56) References Cited

U.S. PATENT DOCUMENTS

| | | | |
|---|---|---|---|
| 5,463,520 A | 10/1995 | Nelson | |
| 6,430,016 B1 | 8/2002 | Marr | |
| 6,683,767 B2 * | 1/2004 | Ito et al. | 361/56 |
| 6,768,617 B2 * | 7/2004 | Marr | 361/56 |
| 7,339,770 B2 * | 3/2008 | Maloney et al. | 361/56 |
| 2002/0126430 A1 | 9/2002 | Roohparvar | |
| 2003/0043523 A1 | 3/2003 | Hung et al. | |
| 2003/0202299 A1 * | 10/2003 | Maloney et al. | 361/56 |
| 2004/0233595 A1 | 11/2004 | Ker et al. | |
| 2005/0078419 A1 | 4/2005 | Stockinger et al. | |
| 2005/0128665 A1 | 6/2005 | Roohparvar | |
| 2005/0270714 A1 | 12/2005 | Huang et al. | |

OTHER PUBLICATIONS

Li et al., "Substrate Modeling and Lumped Substrate Resistance Extraction for CMOS ESD/Latchup Circuit Simulation," Proceedings of the 36th ACM/IEEE Conference on Design Automation, Jun. 1999, pp. 549-554.
Ker et al., "ESD Protection Design for Mixed-Voltage I/O Buffer with Substrate-Triggered Circuit," IEEE Transactions on Circuits and Systems—I: Regular Papers, vol. 52, No. 1, Jan. 2005, pp. 1-10.
International Search Report, PCT/US2007/069451, mailed Dec. 5, 2007.
International Written Opinion of International Searching Authority, dated Dec. 10, 2008 for International Appplication No. PCT/US20071069451; 5 pages.

* cited by examiner

*Primary Examiner*—Danny Nguyen

(57) ABSTRACT

An improved ESD protection device, integrated circuit and method for programmably altering a sensitivity of the ESD protection device is provided herein. More specifically, an active shunt ESD protection device is provided with an improved trigger circuit design. The improved trigger circuit design enables the sensitivity of the ESD protection device to be altered by providing a variety of programmable elements for adjusting an RC time constant of a slew rate detector contained therein. The programmable elements allow the RC time constant to be altered at the wafer or package level, and avoid the significant time and cost typically associated with conventional trial-and-error adjustment procedures.

25 Claims, 8 Drawing Sheets

PROGRAMMABLE ELECTROSTATIC DISCHARGE (ESD) PROTECTION DEVICE

BACKGROUND OF THE INVENTION

1. Field of the Invention

This invention relates to integrated circuits and, more particularly, to circuitry for protecting integrated circuit components from damage caused by high slew rate, overvoltage and/or overcurrent conditions, such as those caused by electrostatic discharge.

2. Description of the Related Art

The following descriptions and examples are given as background only.

Integrated circuits are susceptible to damage from application of excessive electrical charge, such as those generated during electrostatic discharge (ESD) events. For example, integrated circuits (ICs) may be exposed to electrostatic charges during manufacturing of the integrated circuit (wafer level), handling of the integrated circuit after packaging and/or handling of a printed circuit board after assembly. In some cases, an integrated circuit may be exposed to the charges that arise from the use of plasma etching techniques or other fabrication processes that produce charged particles. In other cases, a packaged integrated circuit may be exposed to electrostatic charges when a person inadvertently touches the exposed pins on the circuit package, or when the package becomes electrostatically charged due to movement of the package across an electrically-conductive surface.

The electrostatic charges transferred during an ESD event can inflict significant damage to sensitive components of an integrated circuit. For example, transistors and other electrical devices on an integrated circuit may be damaged when an excessive amount of charge is transferred between one or more pins of the integrated circuit and another conducting object in a short time period, usually between tens and hundreds of nanoseconds. The transferred charge (referred to as electrostatic discharge) may develop voltages, which may be large enough to break down insulating films on the circuit (such as gate oxides), or dissipate sufficient energy to cause electro-thermal failures in the circuit (such as contact spiking, silicon melting and metal interconnect melting).

For this reason, many attempts have been made to protect integrated circuits, with particular attention to the problem of protecting field effect transistor (FET) devices and other sensitive circuitry from ESD events. In some cases, ESD protection devices may be connected between the input/output (I/O) pads and internal circuitry of an IC to redirect the energy generated during an ESD event away from the sensitive circuitry. Protection devices may also be connected to power supply pads or between power supply buses to prevent damage during ESD events.

In some cases, ESD protection devices may use "snapback devices," or devices which rely on parasitic bipolar devices, including bipolar junction transistors (BJTs) and thyristors which are inherent in most semiconductor integrated circuits. These bipolar devices can include those devices normally considered parasitic devices in technologies that use field effect transistors (FET) such as complementary metal-oxide-semiconductor (CMOS) based integrated circuits. During an ESD event, the bipolar device can enter a conductive state to safely dissipate the ESD discharge.

For example, a grounded or floating gate n-channel FET (NFET) may be used as an ESD protection device (100) by connecting the drain terminal of the NFET (110) to an external pin (120) of the integrated circuit, and the source terminal of the NFET to ground, as shown in FIG. 1A. The gate terminal of the NFET may either be floating or be connected to ground. During normal operation of the integrated circuit, the NFET is not active (i.e., has a gate-to-source voltage equal to zero volts, as shown in FIG. 1A), and thus, provides a high-impedance path from the external pin to ground. The ESD protection NFET has thus no significant effect during normal operation of the integrated circuit.

However, during ESD events, the ESD protection device relies on a "snapback" mechanism that provides a low impedance path between the drain and source terminals of the NFET, and redirects potentially damaging ESD charge away from the sensitive circuit elements. In the snapback region (FIG. 1C), the parasitic lateral npn bipolar junction transistor (130) (FIG. 1A) associated with the NFET provides a low-impedance path between the "zapped" pin (120) (FIG. 1A) and ground for the ESD charge injected at the protected integrated circuit pin. The "zapped" pin refers to the integrated circuit pin for which the ESD event occurs.

Snapback generally occurs when the voltage on the zapped pin increases to a value high enough (e.g., 8 volts for a typical CMOS process) to cause the n drain/p substrate junction of the NFET to break down. FIG. 1B shows a semiconductor cross section of the ESD protection NFET 110, including the parasitic BJT 130 during the breakdown region shown in FIG. 1A. This breakdown, otherwise referred to as avalanche breakdown, causes a hole current near the drain of ESD protection NFET 110 to be injected into the substrate, which in turn, raises the local substrate potential and causes the source-substrate junction to become forward biased. Conduction between the "zapped" pin and ground stops when the ESD charge is removed and the NFET resumes its normal drain-to-source high-impedance state.

Although snapback devices are often used within ESD protection devices, they are not without disadvantages. For example, it is hard to predict/control the behavior of actual snapback devices fabricated in silicon, since the behavior of their parasitic BJTs cannot be accurately simulated (due to the fact that snapback devices operate in a region—the snapback region—which is largely unmodeled) and their parameters can be difficult to control in an actual implementation. The lack of predictability can lead to inferior ESD protection performance, over-designed networks or both. Consequently, such ESD protection schemes can consume relatively large amounts of silicon area and can affect the stand-by current budgets of the chips they are used in.

Active shunt networks (otherwise referred to as "actively switched networks", or "rail-based networks") represent another method used to implement ESD protection. Within these networks, a control circuit is used to activate the turn on of certain devices (e.g., ESD clamps), which conduct the ESD current through an actively switched network. The control circuit is capable of differentiating between normal operation of the integrated circuit and an ESD event. The control circuit which detects the ESD event is commonly called an "ESD trigger circuit". In contrast to the snapback ESD protection method described above, active shunt ESD protection networks can be simulated using conventional circuit simulators, resulting in more predictable protection from ESD discharges, which can take comparatively less area for the same ESD performance.

In some cases, an active shunt ESD circuit 200 may include a plurality of diodes, an ESD trigger circuit 210 and an active shunt device 220, as shown in FIG. 2. For example, diodes D1, D2 may be coupled to an external pin of an integrated circuit (e.g., a "zapped pin") to redirect ESD current away from the protected internal circuitry (230) during an ESD event. The trigger circuit (210) may be coupled for detecting an ESD event at the zapped pin and for activating the active shunt device (e.g., a single NFET) in response thereto. In some cases, the active shunt device 220 may be referred to as an "ESD clamp" or a "current switch". Once activated, the ESD clamp and diodes may redirect current away from the sensitive circuitry by transferring the current from the zapped pin to a ground supply pin. In most cases, the ESD clamp may be activated only if the slew rate of the zapped pin (i.e., the rate at which the voltage supplied to the zapped pin changes over time) is determined to correspond to an ESD event. In other words, the ESD clamp is designed to not become active during normal operational modes of the integrated circuit or during power-up of the integrated circuit.

The active shunt ESD protection method described above provides several advantages over conventional ESD protection methods that use snapback devices. First of all, ESD protection network circuit behavior can be accurately simulated and controlled by using devices (such as ESD clamps), which operate in the linear or saturation regions of the current-to-voltage (IV) curve, as shown in FIG. 1C. In addition, active shunt ESD circuits often require fewer devices to provide the same amount of ESD protection, and thus, consume less power and area than snapback ESD circuits. Active shunt ESD circuits may also provide better protection at much higher ESD voltages (e.g., up to about 4000 volts) than those using snapback devices (e.g., up to about 1500 volts).

However, active shunt ESD circuits may not provide adequate ESD protection in all cases. In particular, the behavior of the trigger circuit is often hard to control over process variations. For example, the ESD trigger circuit operates by comparing a voltage signal, which is proportional to the voltage slew rate at the zapped pin, with a threshold voltage of a FET transistor included within the trigger circuit. In addition to the slew rate, the voltage signal is determined by several components included within the trigger circuit. Process variations within any one of these components may influence the operation of the trigger circuit by shifting the respective voltage signal to a substantially higher or lower level. In some cases, the trigger circuit may fail to detect a true ESD event when process variations cause the voltage signal to be shifted to a level below the threshold voltage (i.e., trip point) of the trigger circuit. Such failure may allow a potentially damaging electrostatic charge to be supplied to the internal circuitry of an integrated circuit.

One solution to the problem is to adjust the sensitivity of the ESD trigger circuit based on experimental data. For example, the ESD event sensitivity of a particular trigger circuit design may be tested after the respective integrated circuit has been fabricated. If the active shunt ESD protection network fails to trigger during an ESD event, the sensitivity of the trigger circuit may be increased in order to generate the desired voltage level. Once the appropriate changes are made, the integrated circuit may be taped-out again and the ESD protection may be re-verified in the lab once the circuit is fabricated. The process may then continue by trial-and-error until the trigger circuit is provided with sufficient sensitivity to detect ESD events (i.e., the ESD protection provided to the integrated circuit meets certain ESD requirements).

Unfortunately, such a process is time consuming and costly. In addition, the ESD circuits resulting from such a process cannot be reused for other chips (e.g., with different sizes and/or ESD requirements). Therefore, a need remains for an improved ESD protection device that overcomes the disadvantages set forth above. More specifically, a need remains for an improved ESD trigger circuit design that allows ESD event sensitivity to be reconfigured without incurring the additional cost and time associated with the trial-and-error process described above.

SUMMARY OF THE INVENTION

The following description of various embodiments of ESD protection devices, integrated circuits and methods is not to be construed in any way as limiting the subject matter of the appended claims.

According to one embodiment, an electrostatic discharge (ESD) protection device is provided for preventing current from flowing through a circuit during an ESD event. In most embodiments, the ESD protection device may protect sensitive circuit components from excessive ESD charge supplied to one or more input pins, output pins, input/output pins, ground supply pins or power supply pins of an integrated circuit (IC) package. For example, the ESD protection device may include a plurality of diodes coupled between an input pin of the IC and at least one of a power supply bus and a ground supply bus (and, in some cases, a dedicated ESD bus). In addition, the ESD protection device may include a shunting device and an ESD trigger circuit. The shunting device may be coupled between the power supply bus and the ground supply bus for redirecting current away from the sensitive circuit components during the ESD event. The trigger circuit may be coupled between the power supply bus (or the dedicated ESD bus) and the ground supply bus for detecting the ESD event and activating the shunting device in response thereto. As such, the ESD protection device may be alternatively referred to as an "active shunt" protection device.

In general, the trigger circuit may include a Slew Rate Detector, a Pulse Generator and an Output Driver. The Slew Rate Detector may be configured for generating a voltage signal, which is proportional to an RC time constant and the slew rate of the power supply (or ESD) bus. For example, the RC time constant of the Slew Rate Detector may be determined by a plurality of resistors and capacitors. The plurality of resistors may be coupled in series between the output node of the Slew Rate Detector and the ground supply bus. The plurality of capacitors may be coupled in parallel between the power supply (or ESD) bus and an output node of the Slew Rate Detector. The voltage signal generated at the output node of the Slew Rate Detector is supplied to the Pulse Generator. If the voltage signal at the output node of the Slew Rate Detector is greater than or equal to a first threshold voltage, a first pulse is generated at an output node of the Pulse Generator. The first pulse is then supplied to the Output Driver. If a voltage level of the first pulse is greater than or equal to a second threshold voltage, a second pulse is generated at an output node of the ESD trigger circuit. If generated, the second pulse may be supplied to the shunting device for activating the shunting device and redirecting current away from the sensitive circuit components during the ESD event.

Unlike conventional designs, the trigger circuit described herein may include a variety of programmable elements for altering a sensitivity at which the ESD protection device senses an electrostatic discharge applied to the integrated circuit. For example, the sensitivity of the ESD protection device may be changed if the ESD protection device fails to detect a true ESD event. As described in more detail below, the sensitivity of the ESD protection device to ESD events may be changed by using the programmable element to alter the RC time constant of the Slew Rate Detector.

In one embodiment, the programmable element may be implemented with at least one fuse. For example, one or more fuses may be coupled between the power supply (or ESD) bus and a capacitor of the Slew Rate Detector for changing the amount of capacitance in the Slew Rate Detector RC time constant. In some cases, one or more fuses may be additionally or alternatively coupled between the ground supply bus and a resistor of the Slew Rate Detector for changing the amount of resistance in the Slew Rate Detector RC time constant. In general, the one or more fuses may be selected from a group of fuses comprising normally-open fuses and normally-closed fuses.

In another embodiment, the programmable element may be implemented with at least one transistor. For example, one or more transistors may be coupled between the power supply (or ESD) bus and a capacitor of the Slew Rate Detector for changing the amount of capacitance in the Slew Rate Detector RC time constant. In some cases, one or more transistors may be additionally or alternatively coupled between the ground supply bus and a resistor of the Slew Rate Detector for changing the amount of resistance in the Slew Rate Detector RC time constant.

The one or more transistors may be controlled by digital voltage signals, in some embodiments, and analog voltage signals in others. For example, the transistors may be coupled for receiving a "high" logic state to add resistance/capacitance, and a "low" logic state to remove resistance/capacitance from the voltage signal generated at the output node of the Slew Rate Detector. By supplying digital voltage signals (i.e., high and low logic states), the transistors may form a switch that can be used to add or remove fixed amounts of resistance/capacitance to the voltage signal. On the other hand, analog voltage signals may be supplied to the transistors for adding or removing variable amounts of resistance/capacitance to the voltage signal. For example, a variable voltage level may be supplied to the transistors for adding (or removing) variable amounts of resistance and/or capacitance by shifting the operational mode of the transistors.

The voltage signals supplied to the one or more transistors may be obtained from internal sources, in some embodiments, and external sources in others. For example, the voltage signals described above may be obtained from an internal source (e.g., an on-chip voltage divider or storage device) or from an external source (coupled, e.g., to an external pin of the integrated circuit). In some cases, a storage device may be coupled to the one or more transistors for storing a specified voltage value (e.g., a predetermined high or low value compared with the ground potential). In some cases, the storage device may be implemented with substantially any type of volatile or non-volatile memory. For example, the storage device may be selected from a group of non-volatile memory comprising Flash, SRAM, FRAM, MRAM, EEROM, EEPROM and SONOS memory cells. However, the storage device is not limited to memory and may be implemented with alternative storage means in other embodiments of the invention.

An integrated circuit comprising an improved ESD protection device and method for programmably altering a sensitivity of an ESD protection device is also provided herein.

BRIEF DESCRIPTION OF THE DRAWINGS

Other objects and advantages of the invention will become apparent upon reading the following detailed description and upon reference to the accompanying drawings in which.

Figure 1A:
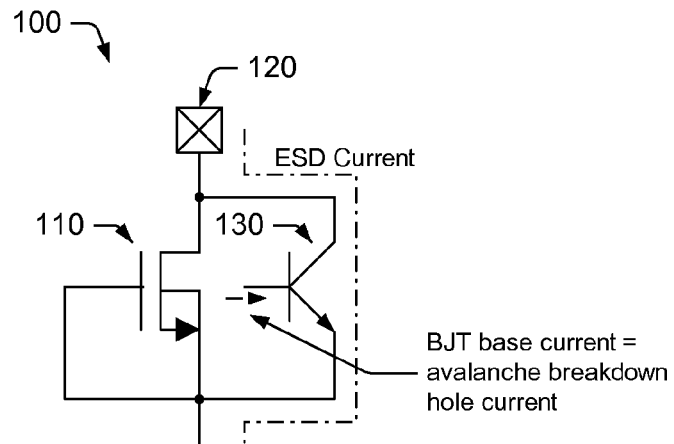
FIG. 1A is a circuit diagram illustrating one embodiment of a "snapback" ESD protection device.
Figure 1B:
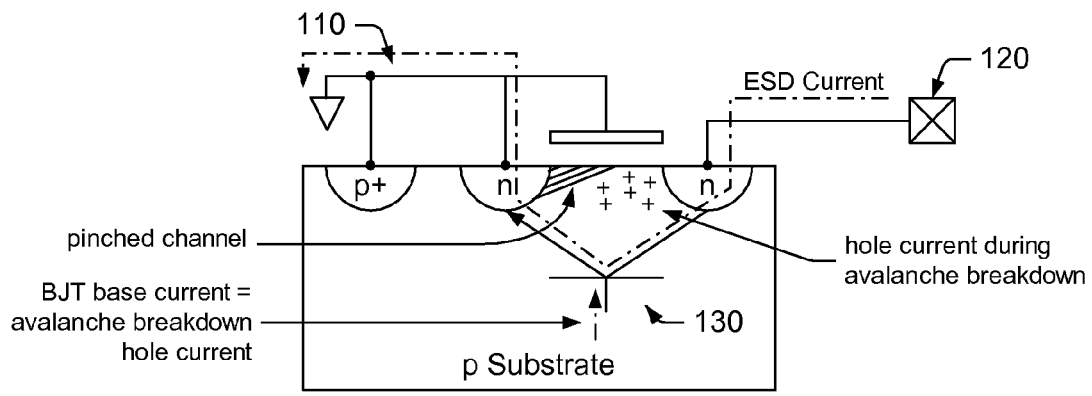
FIG. 1B is a cross-sectional view of the "snapback" ESD protection device shown in FIG. 1A.
Figure 1C:
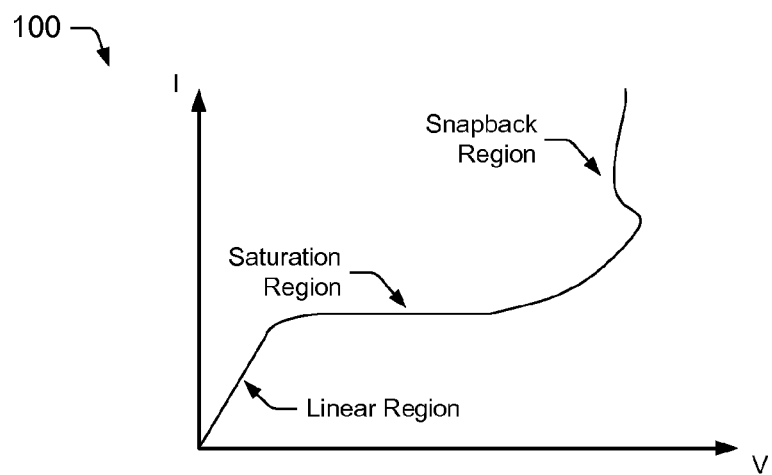
FIG. 1C is a graph illustrating a typical current-voltage (I-V) curve for a field effect transistor (FET)

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

An electrostatic discharge (ESD) event occurs when an excessive amount of charge is supplied to sensitive circuitry within an integrated circuit over a relatively short period of time, usually tens to hundreds of nanoseconds. The excessive amount of charge (otherwise referred to as "ESD current" or "ESD charge") may be supplied to external pins of the integrated circuit (e.g., when a person inadvertently touches the exposed pins of a circuit package), or may be generated within the integrated circuit itself (e.g., during fabrication processes that produce charged particles). Although the amount of ESD current thus created ultimately depends on the sensitive circuitry requiring ESD protection, the terms "excessive current," "ESD current," and "ESD charge" may be loosely described as a short pulse of current, which is large enough to inflict damage upon the sensitive circuitry requiring ESD protection.

For example, an ESD current of approximately 3.33 A, corresponding to 5000V of initial voltage (V) on a 100 pF capacitor (C) discharging through a 1.5 KOhm resistor (the Human Body Model for an ESD event), may be sufficient to inflict damage upon a field effect transistor (FET). In other words, the energy dissipated by the 100 pF capacitor when heating the silicon (e.g., it generally takes approximately 0.7 joules (J) to heat one gram of silicon by 1° C.) is approximately $(C*V^2)/2=1.25$ mJ. Since the temperature of 1 μg of silicon heats up to approximately 1400° C. when supplied with 1 mJ of energy (assuming an initial temperature of 28° C.), the temperature generated by the above-mentioned ESD current is enough to melt the silicon and permanently damage the FET. It is noted, however, that substantially higher or lower levels of ESD current may cause damage to other circuit components.

Active shunt is one method that may be used to implement ESD protection in integrated circuits. In most cases, an active shunt ESD protection device may include an ESD trigger circuit for detecting an ESD event, along with a plurality of diodes and a shunting device (sometimes referred to as an active shunt or ESD clamp) for redirecting current away from the sensitive circuitry of an integrated circuit during the ESD event. As described in more detail below, the shunting device may be coupled between a power supply bus (VCC) and a ground supply bus (VSS) of the integrated circuit. In some cases, the trigger circuit may also be coupled between the power supply bus and ground supply bus. In other cases, the trigger circuit may be coupled between the ground supply bus and a dedicated ESD bus (not shown). In either case, the trigger circuit may be configured for detecting the ESD event and activating the shunting device in response thereto.

Figure 2:
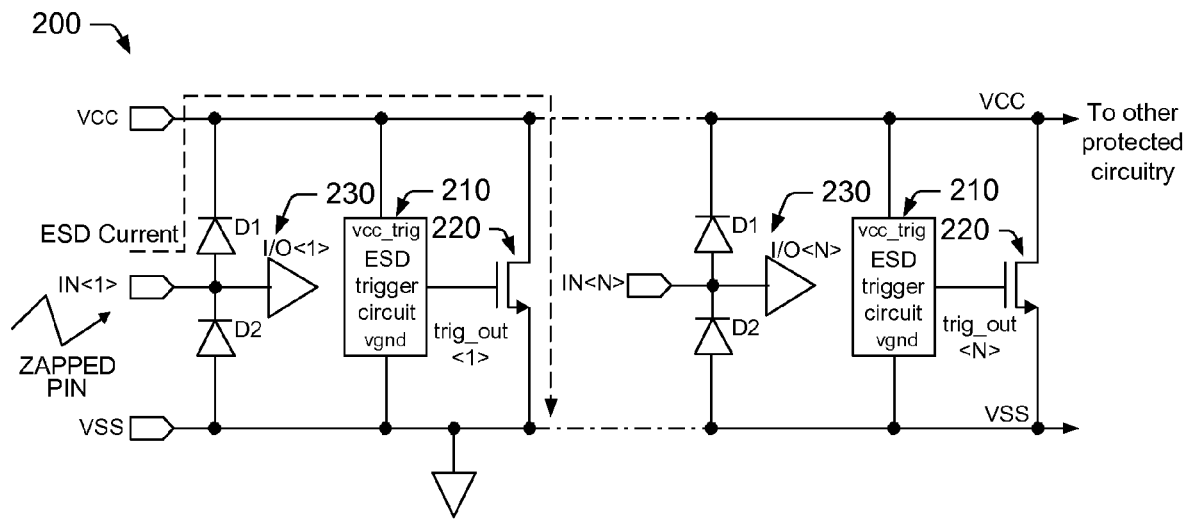
FIG. 2 is a block diagram illustrating one embodiment of an "active shunt" electrostatic discharge (ESD) protection device.

In some cases, the plurality of diodes (e.g., D1, D2) may each be coupled between an input pin (e.g., IN<1>) of the integrated circuit and either the power supply bus or the ground supply bus, as shown in FIG. 2. In other cases, the plurality of diodes may each be coupled between an input pin and at least one of a power supply bus (VCC), a ground supply bus (VSS) and a dedicated ESD bus (not shown). In the embodiment of FIG. 2, the ESD trigger circuit (such as the one shown in FIG. 3) is coupled between VCC and VSS. The output (TRIG_OUT) of the ESD trigger circuit is connected to a shunting device (e.g., a single FET ESD clamp), which is also connected between VCC and VSS. In this configuration, the plurality of diodes and shunting device work together to provide ESD protection at the input pin(s) of the integrated circuit. Although not shown in FIG. 2, ESD protection may be additionally (or alternatively) provided at other pins of the integrated circuit, such as a power supply pin(s), output pin(s) or input/output pin(s).

The general operation of an active shunt ESD protection device will now be described in reference to FIG. 2. As noted above, the plurality of diodes may be coupled between an input pin (e.g., IN<1>) of the integrated circuit and at least one of a power supply bus (VCC) and a ground supply bus (VSS). Note: the VCC_TRIG pin of ESD trigger circuit 210 is connected to the VCC bus. In the embodiment shown, diode D1 is coupled between the input pin and the power supply bus (VCC), while diode D2 is coupled between the ground supply bus (VSS) and the input pin. When an excessive amount of ESD current is supplied to the input pin, the ESD charge is transferred from the "zapped" input pin to the power supply bus (VCC) via diode D1, causing a sharp rise in the VCC voltage.

In the embodiment of FIG. 2, the ESD trigger circuit (210) is coupled between the power supply bus (VCC) and ground for detecting ESD events at the protected input pin (e.g., IN<1>). For example, the trigger circuit may detect an ESD event and generate an output pulse, if the slew rate of the VCC bus, and thus, the slew rate of the zapped input pin, is above an "always trigger" threshold value (e.g., 1.5 volts/ns). On the other hand, generation of an output pulse may be prevented, if the slew rate of the VCC bus is below a "never trigger" threshold value (e.g., 0.05 volts/ns). The comparison of the slew rate to the "always trigger" and "never trigger" threshold values enables the trigger circuit to: (a) generate an output pulse if relatively fast slew rates are detected (e.g., slew rates equal to or larger than the "always trigger" value), indicating the occurrence of an ESD event, or (b) never generate an output pulse if relatively slow slew rates are detected (e.g., slew rates smaller than or equal to the "never trigger value"), such as those occurring during normal chip power-up, or as a result of noise on the power supply during normal functional mode of the integrated circuit. As used herein, the "slew rate" of a bus or pin may be defined as the rate at which a corresponding voltage changes over time.

When an ESD event is detected, the output pulse generated by the trigger circuit is supplied to one or more shunting devices connected between the power supply and ground supply buses. When activated by the output pulse, the shunting devices (e.g., ESD clamps) may route the ESD current from the power supply bus to the ground supply bus, as shown in FIG. 2. For example, the activated shunting devices may work in conjunction with the plurality of diodes at the zapped pin to redirect ESD current away from the sensitive circuitry of the integrated circuit (230) by transferring the ESD current from the zapped pin to the power supply bus via diode D1, and from the power supply bus to the ground supply bus via the VCC-to-VSS path through the activated shunting device (220).

In one embodiment, the active shunt device (220) may be implemented with a single NFET device, as shown in FIG. 2. However, the shunting devices are not limited to this implementation, and may be alternatively implemented in other embodiments of the invention. For example, the shunting devices may be implemented with cascoded FETs in some embodiments of the invention. Regardless of the particular device chosen, the shunting devices are configured to provide a discharge path from the VCC bus to the VSS bus. Because these buses handle the bulk of the ESD current, on-chip IR voltage drops across the VCC and VSS buses can be appreciable.

As noted above, the trigger circuit is configured to: (a) always generate an output pulse if the slew rate of the dedicated ESD bus is above an "always trigger" threshold value (indicating the occurrence of an ESD event), and (b) never generate an output pulse if the slew rate of the dedicated ESD bus is below a "never trigger" threshold value (indicating normal chip operation or power-up). Between the "always trigger" and "never trigger" regions, an intermediate region exists where the trigger circuit output behavior cannot be guaranteed. In some cases, situations may arise which cause the trigger circuit to enter the intermediate region. For example, power supply noise may cause the trigger circuit to unexpectedly trigger during normal chip operation. On the other hand, process variations may cause the trigger circuit to fail to trigger in response to a true ESD event. Although the failure to trigger produces obvious results (namely, damage to sensitive circuitry), triggering during normal chip operation is also undesirable and may significantly affect chip performance (e.g., by increasing access times for a memory chip or output jitter for a communications chip). Therefore, it is generally desired that the behavior of the trigger circuit be carefully controlled, so that trigger circuit operation remains within the "always trigger" region (for ESD events) and "never trigger" region (for power-up and normal functional mode). If carefully controlled, trigger circuit operation should never enter the intermediate region.

Figure 3:
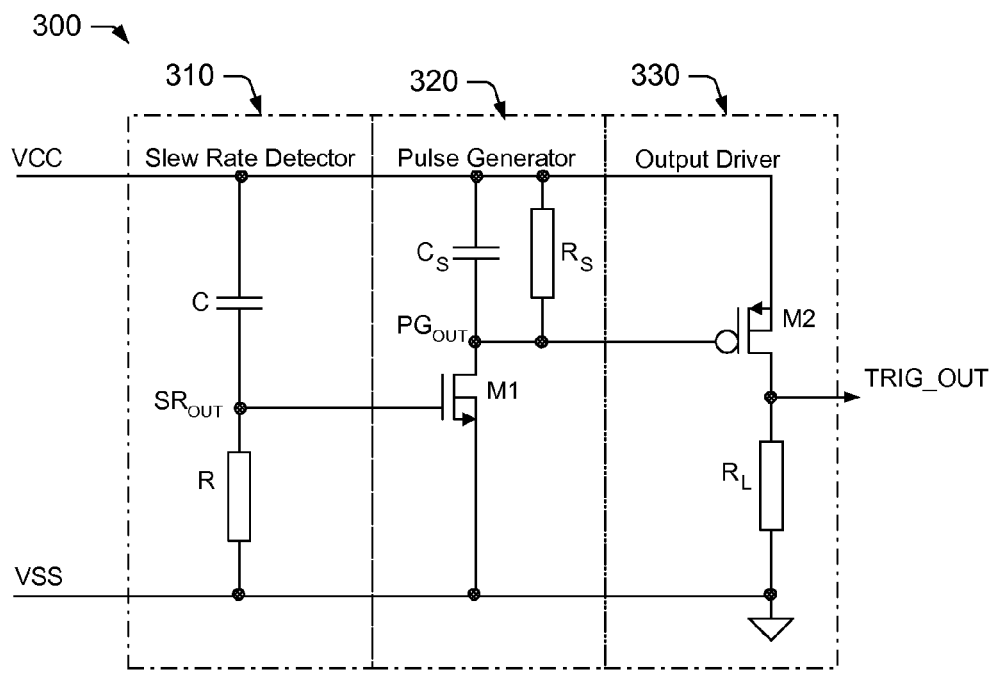
FIG. 3 is a simplified circuit diagram illustrating one embodiment of an ESD trigger circuit that may be included within the "active shunt" ESD protection device of FIG. 2.

In one embodiment, the ESD trigger circuit may be implemented as a three-stage circuit. For example, trigger circuit 300 may include a Slew Rate Detector 310, a Pulse Generator 320 and an Output Driver 330, as shown in FIG. 3. In the embodiment shown, Slew Rate Detector 310 includes a single capacitor (C) and resistor (R) coupled in series between the power supply bus (VCC) and ground (VSS). In some cases, Slew Rate Detector 310 may be an implemented as an RC differentiator. If an ESD event occurs on the VCC bus, the Slew Rate Detector generates a signal proportional to the slew rate of the VCC bus and the RC time constant of the Slew Rate Detector circuit 310. In other words, the Slew Rate Detector may generate:

$$V(SR_{OUT}) = R * C * d(VCC)/dt, \quad \text{EQ. 1}$$

where d(VCC)/dt is the slew rate associated with the VCC bus, R is the Slew Rate Detector resistance value and C is the Slew Rate Detector capacitance value. As shown in FIG. 3, the $V(SR_{OUT})$ signal is generated at an output node ($SR_{OUT}$) of the Slew Rate Detector 310. The $SR_{OUT}$ node is arranged between the resistor and capacitor of the Slew Rate Detector and coupled for supplying the signal to the Pulse Generator 320.

In some cases, Pulse Generator 320 may include a voltage level detector and a pulse extender coupled in series between the power supply bus (VCC) and ground (VSS). In the embodiment shown, the voltage level detector is implemented with an NMOS transistor (M1), while the pulse extender is implemented with a parallel RC circuit ($R_S$, $C_S$). Although MOS transistors are used throughout the various embodiments, one skilled in the art would understand how the invention could be modified to include other process technologies. It should also be noted that alternate implementations of the Pulse Generator, which are not specifically shown or described herein, are possible and within the scope of the invention.

The voltage level detector detects ESD events by comparing the voltage at the output of the Slew Rate Detector to the threshold voltage (Vth) of NMOS transistor M1. If $V(SR_{OUT})$ >=Vth(M1), an ESD event is detected and transistor M1 becomes active and supplies a short pulse of drain current to the parallel RC circuit ($R_S$, $C_S$). This generates a voltage pulse between the VCC and $PG_{OUT}$ nodes in the Pulse Generator 320. The $R_S*C_S$ time constant of the Pulse Generator circuit, along with the amplitude and duration of the current pulse provided during the ESD event by NFET M1, dictate the pulse width of the voltage pulse generated between nodes VCC and $PG_{OUT}$. If an ESD event is not detected (i.e., if $V(SR_{OUT})$<Vth(M1)), transistor M1 does not become active and no voltage pulse is generated between nodes VCC and $PG_{OUT}$.

In some cases, Output Driver 330 may be connected in series with Pulse Generator 320 for processing the voltage pulse generated between the VCC and $PG_{OUT}$ nodes of the Pulse Generator. If V(VCC, $PG_{OUT}$)>=Vth (M2), PFET M2 is activated and a pulse of current is generated at the drain of PFET M2. This current generates a voltage pulse across the load resistance ($R_L$) arranged at the output pin (TRIG_OUT) of the ESD trigger circuit 300. If V(VCC, $PG_{OUT}$)<Vth (M2), no pulse is generated at the output pin of the ESD trigger circuit 300. Ideally, a pulse will only be generated at the output pin (TRIG_OUT) of the ESD trigger circuit during an ESD event. Although not specifically shown or described herein, alternative implementations of the Output Driver are possible and within the scope of the invention. Although trigger circuit 300 may provide adequate ESD protection in some cases, it may not function properly under all circumstances. For example, the behavior of trigger circuit 300 is often affected by process variations. As noted above, the trigger circuit operates by comparing a first voltage signal $V(SR_{OUT})$ to a first threshold voltage (Vth(M1)), and a second voltage signal V(VCC, $PG_{OUT}$) to a second threshold voltage (Vth(M2)). In addition to the slew rate of the VCC bus, the trigger circuit comparisons are dependent on the RC time constant of the slew rate detector, the threshold voltage of transistor M1, the RC time constant of the pulse extender and the threshold voltage of transistor M2. Process variations within any one of the R, C, M1, $R_S$, $C_S$ and M2 components can affect trigger circuit behavior by shifting the generated voltage signals ($V(SR_{OUT})$, V(VCC, $PG_{OUT}$)) and/or the threshold voltages (Vth(M1), Vth(M2)) to substantially higher or lower levels. For example, the trigger circuit may fail to detect a true ESD event when process variations cause $V(SR_{OUT})$ to be shifted to a level below Vth(M1) (i.e., the trip point of the trigger circuit). Such failure may allow a potentially damaging electrostatic charge to be supplied to the protected circuitry of an integrated circuit, as the ESD protection network does not become active.

Figure 5:
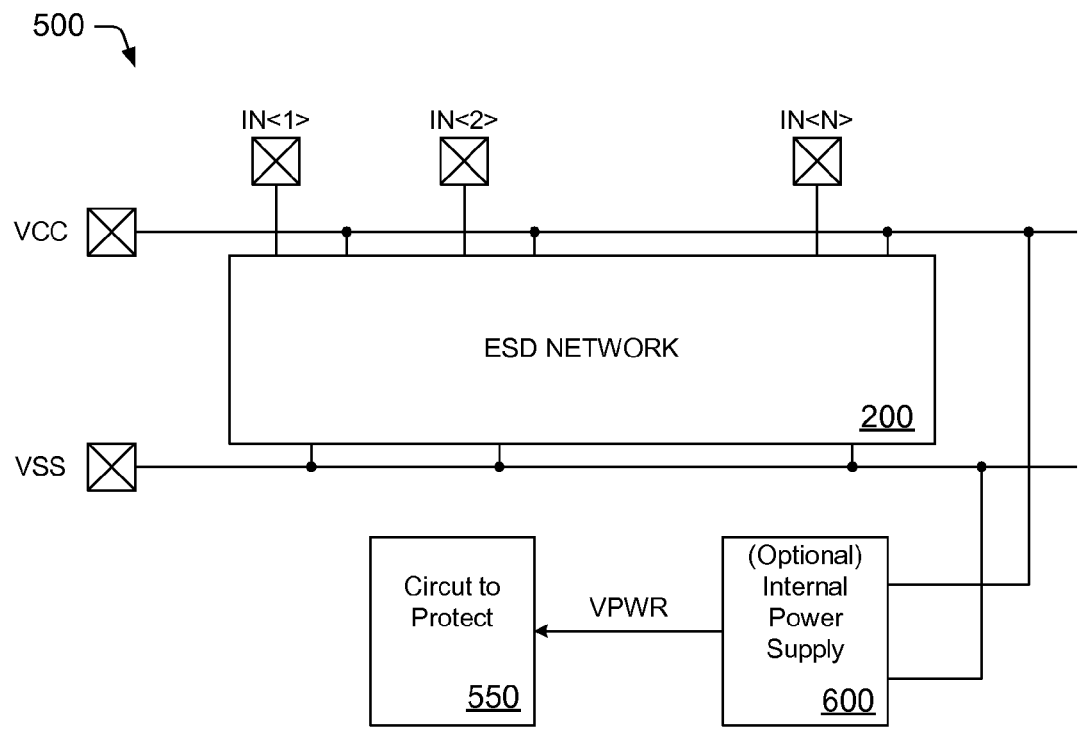
FIG. 5 a block diagram illustrating another embodiment of an integrated circuit including a circuit component coupled between a power supply pin and a ground supply pin, an internal power supply circuit, and an ESD protection device coupled to input pins of the integrated circuit for protecting the circuit component from ESD charges supplied to the input pins.
Figure 6:
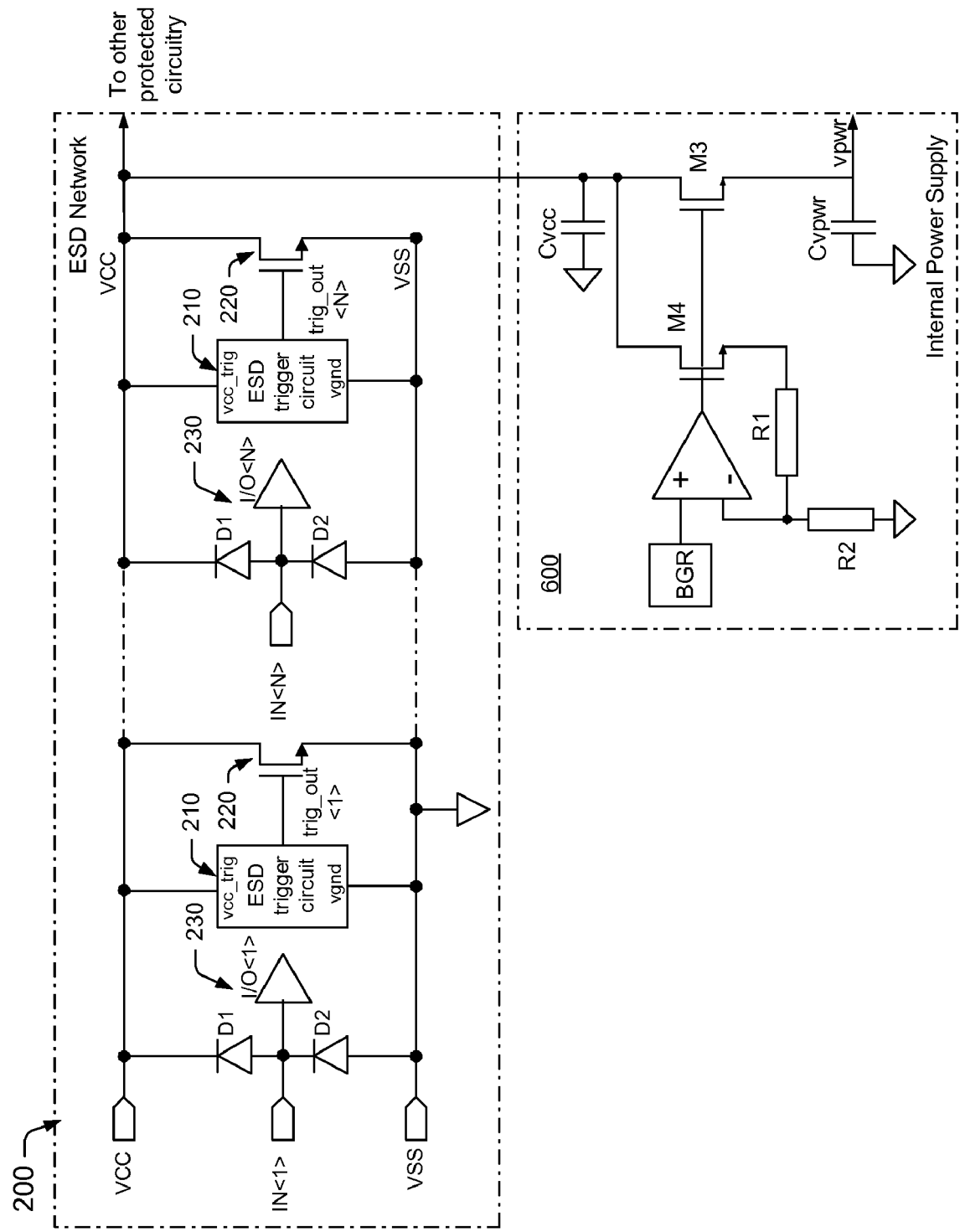
FIG. 6 is a simplified circuit diagram illustrating one embodiment of the internal power supply circuit shown in FIG. 5.

Another problem occurs when the active shunt ESD protection network is employed in a chip which includes a voltage regulator, as shown in FIGS. 5 and 6. For example, a replica-biased voltage regulator 600 may be used to provide a regulated power supply (VPWR) to the chip core. In some cases, the voltage regulator may be connected to the power supply bus (VCC) and an active shunt ESD protection network, similar to the one shown in FIG. 2. During an ESD event, a series regulating element (e.g., NMOS pass transistor M3) may be briefly activated, causing a significant internal regulated supply capacitance $C_{vpwr}$ (e.g., in the nF range or higher, depending on the chip size) to appear in parallel with the external power supply capacitance ($C_{VCC}$) and in parallel with the ESD trigger input. The effective capacitance across VCC may cause the edges of the VCC signal to slow down during an ESD event. If the capacitance is high enough, the slew rate of the VCC signal generated during an ESD event may be reduced below the "never trigger" threshold of the trigger circuit, causing ESD protection to fail.

One solution to the aforementioned problems is to adjust the sensitivity of the ESD trigger circuit based on experimental data. For example, the sensitivity of a particular trigger circuit design may be tested in the lab after the integrated circuit is fabricated. If the ESD trigger circuit fails to trigger during a true ESD event, the sensitivity of the trigger circuit may be increased by increasing the RC time constant of the Slew Rate Detector to generate the same output value for the lower slew rates generated on the VCC bus during the ESD event, in accordance with EQ. 1. In particular, the RC time constant may be increased by replacing the resistor and/or capacitor with components having substantially larger R and/or C values. In some cases, the generated output signal $V(SR_{OUT})$ may be sufficient to overcome process-induced variations within the slew rate detector or uncharacteristically slow slew rates on the VCC bus (due, e.g., to regulated supply capacitance).

Once the appropriate mask changes are made to correct the ESD trigger circuit sensitivity, the integrated circuit may be fabricated again and re-verified in the lab. In some cases, the process may continue by trial-and-error until the trigger circuit sensitivity is correctly tuned. This process is time consuming (taking, e.g., two to six weeks per chip) and costly (due to additional cycles of fabrication). In addition, the ESD circuits resulting from such a process cannot be reused for other chips (e.g., with different ESD requirements and/or different chip sizes with different regulated supply capacitances).

Therefore, a need remains for an improved ESD protection device and method for altering the sensitivity of the ESD protection device without incurring the additional fabrication costs and time associated with conventional techniques. As described in more detail below, the improved ESD protection device may include a programmable element for altering the RC time constant of the Slew Rate Detector, and therefore, changing the sensitivity of the ESD device. Various embodiments of an improved ESD device and method are shown in FIGS. 7-10. It is noted, however, that the inventive concepts presented herein are not limited to the few embodiments shown in FIGS. 7-10 and described below. Alternative implementations not specifically described herein are also possible and within the scope of the invention.

Figure 7:
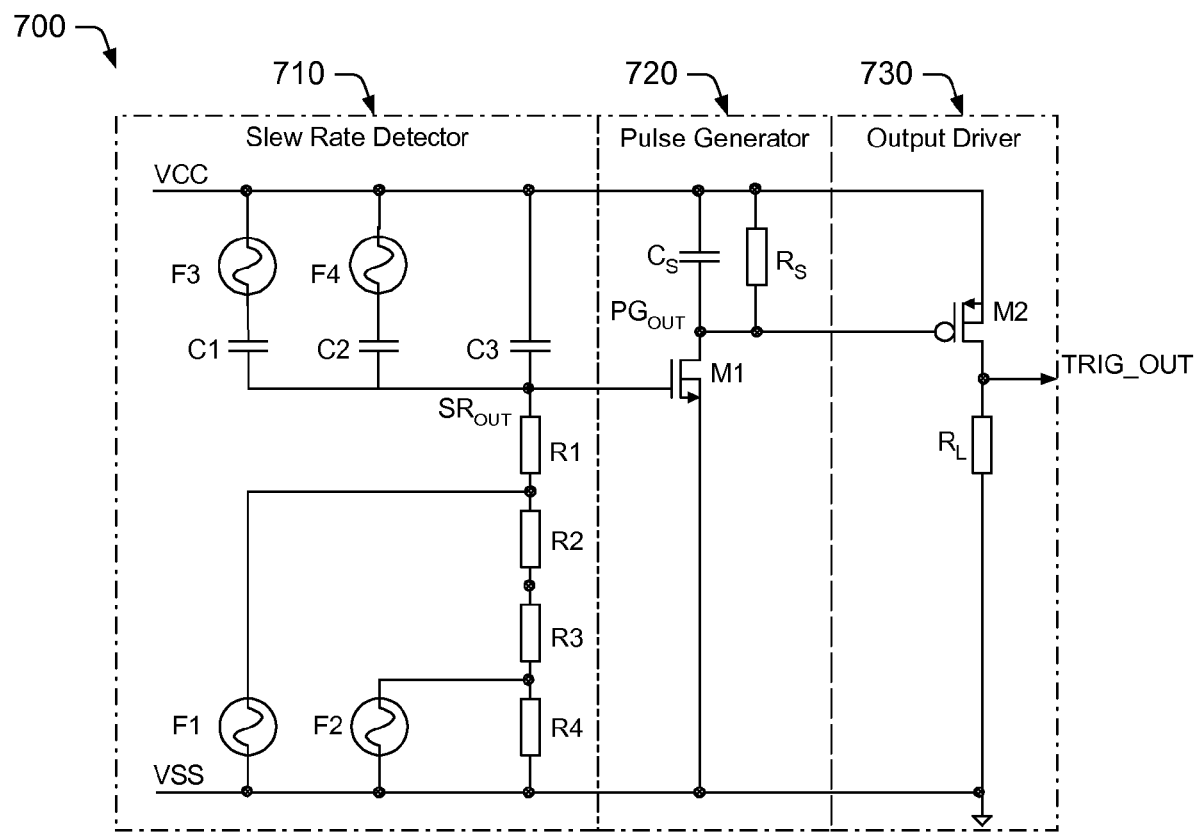
FIG. 7 is a simplified circuit diagram of an ESD trigger circuit that may be included within the ESD protection device of FIG. 2, according to one preferred embodiment of the invention.

FIG. 7 illustrates one embodiment of an improved ESD protection device in accordance with the present invention. More specifically, FIG. 7 illustrates one manner in which the trigger circuit of FIG. 3 may be modified to alter the sensitivity of the ESD protection device shown in FIG. 2. First of all, the slew rate detector of FIG. 3—comprising a single resistor and capacitor—is replaced with a new slew rate detector 710 having a plurality of resistors and a plurality of capacitors. As shown in FIG. 7, the plurality of capacitors (e.g., C1, C2 and C3) are coupled in parallel between the power supply bus (VCC) and the output node (SR$_{OUT}$) of the Slew Rate Detector. The plurality of resistors (e.g., R1, R2, R3, and R4) are coupled in series between the output node (SR$_{OUT}$) and the ground supply bus (VSS). The signal generated at the output node (SR$_{OUT}$) of the Slew Rate Detector is supplied to the Pulse Generator 720. Although Pulse Generator 720 and Output Driver 730 are configured similar to the embodiment shown in FIG. 3, it should be noted that blocks 720 and 730 can be modified without departing from the scope of the invention.

In some cases, the plurality of resistors in Slew Rate Detector 710 may each be implemented to provide the same R value. In other cases, the plurality of resistors may each be implemented to provide different R values. In yet other cases, some of the resistors may provide the same R value, while others provide different R values. The same could be said for the plurality of capacitors. In other words, the choice of R and C values generally depends on the type of resistors and capacitors used, the process variability of these devices, and the range of ESD slew rates perceived by the targeted integrated circuits.

In some cases, the plurality of resistors may be replaced with a plurality of transistors (or some other resistive component), which are coupled in series between the output node (SR$_{OUT}$) of the Slew Rate Detector and the ground supply bus (VSS). In other words, the slew rate detector may include active, rather than passive, resistors in some embodiments of the invention. However, the use of passive resistors may be preferred in most embodiments, due to the fact that active resistors are generally harder to control than passive resistors.

As shown in FIG. 7, slew rate detector 710 may also include a plurality of fuses for programmably altering the RC time constant associated therewith. For example, one or more fuses may be coupled between the ground supply bus (VSS) and different tap points arranged between the resistors of the slew rate detector for adjusting the resistance associated therewith. In the embodiment of FIG. 7, a first fuse (F1) is coupled between the VSS bus and a node arranged between resistors R1 and R2, while a second fuse (F2) is coupled between the VSS bus and a node arranged between resistors R3 and R4. Depending on the fuse type used and the resistance value desired, one or more of the fuses may be activated (in the case of a normally-open fuse) or deactivated (in the case of a normally-closed fuse) to reduce the RC time constant by effectively removing one or more resistors from the resistor string.

In some cases, one or more fuses may be additionally (or alternatively) coupled between the power supply bus (VCC) and a capacitor in the Slew Rate Detector for adjusting the capacitance value associated therewith. In the embodiment of FIG. 7, a third fuse (F3) is coupled between the VCC bus and capacitor C1, while a fourth fuse (F4) is coupled between the VCC bus and capacitor C2. Depending on the type used, one or more of the fuses may be activated (in the case of a normally-closed fuse) or deactivated (in the case of a normally-open fuse) to reduce the RC time constant by providing an open-circuit between one or more capacitors and the VCC bus.

In general, a fuse may be arranged between the VSS bus and: (a) every resistor, (b) every N-number of resistors, or (c) as desired. In addition or alternatively, a fuse may be arranged between the VCC bus and: (a) every capacitor, (b) every N-number of capacitors, or (c) as desired. The present inventors believe that the use of programmable devices, such as fuses, has been avoided in previous ESD circuit designs due to the additional space that would be needed to include such devices. Therefore, it is generally desired that a minimum number of fuses be used to reduce the amount of space consumed by the addition of such devices. FIG. 7 illustrates one such optimization. However, other embodiments of the invention may include more or less fuses to balance the additional space consumption with a desired level of programmability. As a design guideline, fuse configurability may be balanced against the silicon area requirements of the ESD trigger circuit.

As noted above, the fuses may be selected from a group comprising "normally-open" and "normally-closed" fuses. A "normally-open" fuse is one in which the current-carrying members of the fuse are not in engagement when the fuse is in its normal operating state. The opposite is true for a "normally-closed" fuse. Examples of normally-open fuses include, but are not limited to, the gate oxide of a field effect transistor, a large value (e.g., >100K ohm) poly resistor, or any conductor-insulator-conductor sandwich layers that can be shorted post programming. Examples of normally-closed fuses include, but are not limited to, metal fuses, a low value (e.g., <10 K ohm) poly resistor, or any conducting and/or semiconducting material with lower resistivity pre programming and higher resistivity post programming.

The fuses may be one-time programmable (e.g., metal fuses, gate oxides), in some embodiments, and re-programmable (e.g., SONOS devices) in others. Examples of "normally-open" (high resistance state) re-programmable fuses include, but are not limited to, Ferroelectric RAM (FRAM), Magnetic RAM (MRAM) or phase change memory cells. Examples of "normally closed" (low resistance state) re-programmable fuses include, but are not limited to, SONOS and Flash memory cells. Although either type of fuse may be used within Slew Rate Detector 710, normally-closed fuses (e.g., metal fuses) may be preferred in some embodiments of the invention, due to the fact that they are generally cheaper and easier to use than normally-open varieties.

The operation of trigger circuit 700 is similar to that of trigger circuit 300, and thus, will not be repeated herein for the purpose of brevity. However, trigger circuit 700 improves upon trigger circuit 300 by providing programmable means for altering the RC time constant of the Slew Rate Detector, and therefore, modifying the sensitivity of the ESD protection device to ESD events. The fuses included within Slew Rate Detector 710 enable trigger circuit 700 to provide a desired level of programmability without significantly increasing the area consumed by the ESD protection device. The use of fuses also allows post-production tuning of the ESD protection device at the wafer level without requiring the ESD trigger circuit to be re-designed and the integrated circuit to be re-fabricated, thus avoiding the substantial cost and time associated therewith. When incorporated onto an integrated circuit (IC) device, the added programmability of the ESD protection device may even allow a user of the IC device to alter the sensitivity of the ESD protection device as he or she sees fit. For example, the user may have access to the fuse via a circuit interface or laser programmability, depending on the type of the fuse. If the fuses are field programmable, the user may have access to the fuse after packaging for programming the device in the field of use.

Figure 8:
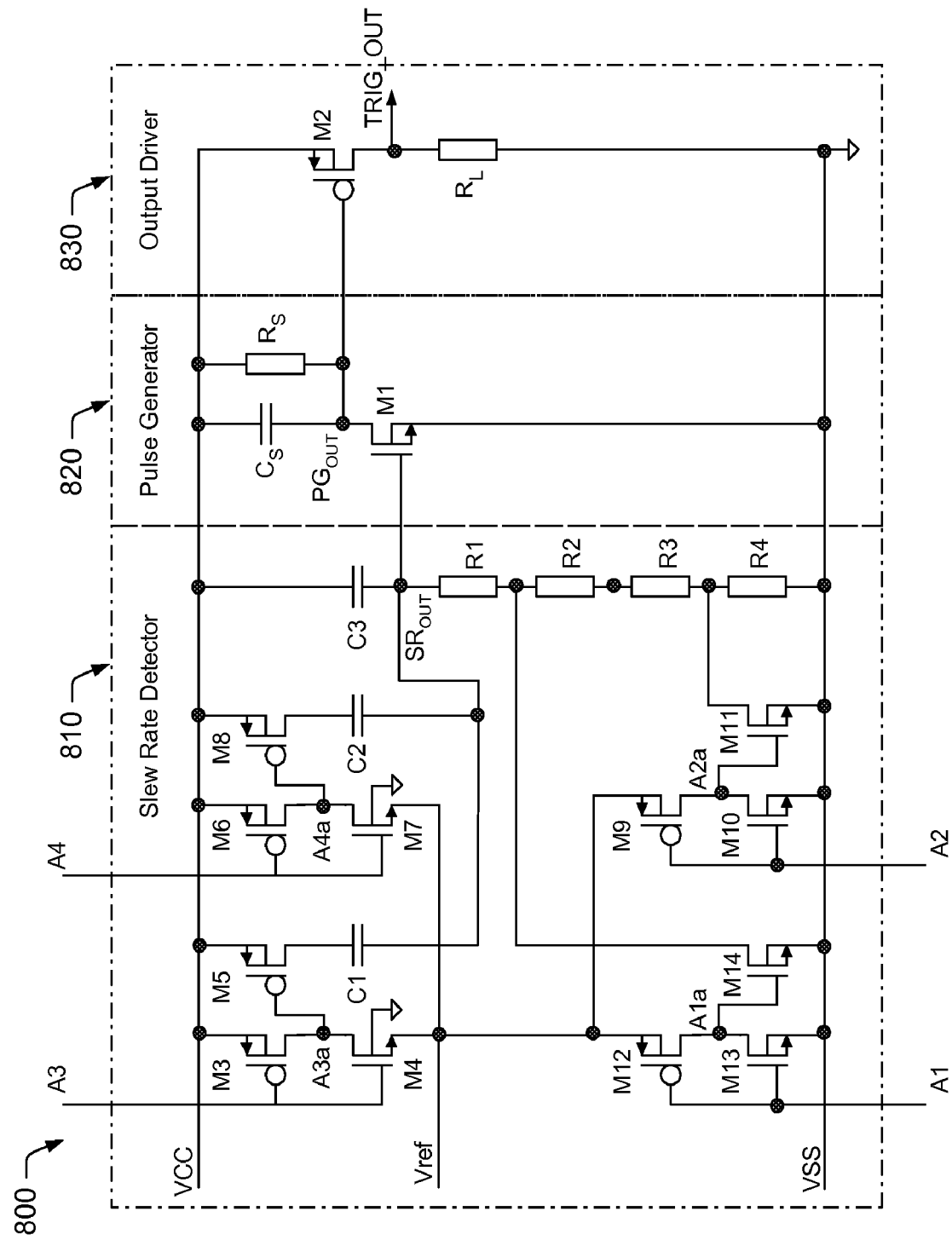
FIG. 8 is a simplified circuit diagram of another ESD trigger circuit that may be included within the ESD protection device of FIG. 2, according to another preferred embodiment of the invention.

FIG. 8 illustrates another embodiment of an improved ESD circuit, or more specifically, an improved trigger circuit design 800 including programmable means for altering an RC time constant of the Slew Rate Detector 810 contained therein. As indicated above, the Pulse Generator (820) and Output Driver (830) blocks may be similar to the ones shown in FIG. 3, or modified to produce a slightly different result. All such implementations are considered to lie within the scope of the invention, and therefore, contained herein.

In addition to the plurality of resistors and capacitors (as described above), Slew Rate Detector 810 may include a plurality of transistor switches for programmably altering the RC time constant associated therewith. Although CMOS transistors are shown in the embodiment of FIG. 8, one skilled in the art would understand how the invention could be modified to include other process technologies.

In some embodiments, one or more transistors may be coupled between the ground supply bus (VSS) and different tap points arranged between the resistors of the Slew Date Detector for adding or removing resistance, and thus, modifying the RC time constant of the Slew Rate Detector. In the embodiment of FIG. 8, the source terminal of NMOS transistor M11 is coupled to VSS, while its drain is coupled to a node arranged between resistors R3 and R4. In addition, the source terminal of NMOS transistor M14 is coupled to VSS, while its drain is coupled to a node arranged between resistors R1 and R2.

In some cases, the gate terminal of transistor M11 may be coupled for receiving a configuration input (A2) from an internal or external source. Depending on the level of the configuration input (A2), transistor M11 may be activated to reduce the RC time constant by removing resistor R4 from the resistor string, or deactivated to increase the RC time constant by adding resistor R4 to the resistor string. Another configuration input (A1) could be supplied to NMOS transistor M14 to (a) active M14 to reduce the RC time constant by removing resistors R2, R3 (and R4) from the resistor sting, or (b) deactivate M14 to increase the RC time constant by adding resistors R2, R3 (and R4) to the resistor string.

In other cases, the gate terminal of transistor M11 may be controlled by the output of an analog multiplexer implemented, e.g., with FET transistors M9 and M10. In the embodiment of FIG. 8, the gate terminal of transistor M11 is connected to the common drain terminals of PFET transistor M9 and NFET transistor M10. The gate terminals of transistors M9 and M10 are coupled for receiving a configuration input (A2) from an internal or external source. The source and body terminals of transistor M10 are connected to the ground pin (VSS) of the ESD trigger circuit. The source and body terminals of transistor M9 are connected to a reference node (Vref) for receiving a reference voltage from an internal or external source.

The reference voltage supplied to node Vref is usually chosen so that PFET M9 will act as a transmission gate for the reference voltage during normal operational modes of the integrated circuit (i.e., when the VCC pin voltage relative to ground is equal, or at least close, to the chip power supply voltage and when configuration input A2 is at or near the ground potential). In some cases, the reference voltage may be obtained from an on-chip or off-chip voltage divider. For example, a voltage divider may be configured to provide a reference voltage, which is equal to about half of the external power supply voltage (e.g., VCC/2) provided to the integrated circuit.

In some cases, the voltage value at the reference node (Vref) may vary during an ESD event. This condition usually occurs within the first 10 ns after the ESD event, when the voltages on the zapped pin and the VCC bus rises to a peak voltage value (typically in the 7-8V range). If this occurs, the analog multiplexer formed with FETs M9 and M10 will function correctly only if the voltage at Vref is larger than the absolute value of the PFET (or NFET) threshold voltage. The condition V(Vref)>|Vth| (NFET or PFET) is assumed in the following explanation of RC time constant adjustments.

In the embodiment of FIG. 8, configuration inputs A1 and A2 are used for controlling the amount of resistance, which is included within the RC time constant of Slew Rate Detector 810. For example, resistor R4 can be added or removed from the RC time constant by setting configuration input A2 to one of two voltage values relative to ground: (a) the voltage value at the reference node (Vref), or (b) the voltage value at the ground node (VSS). More specifically, resistor R4 can be:

a) added to the RC time constant by setting V(A2)=V(Vref). In doing so, NFET M10 is turned on and PFET M9 is turned off, having its source-to-gate voltage ($V_{SG}$) equal to zero volts. As a consequence, node A2a is pulled to ground, ensuring that NFET M11 is turned off and the resistance value of R4 is included within the Slew Rate Detector 810 total resistance.

b) removed from the RC time constant by setting V(A2)=0. In doing so, NFET M10 is turned off, having its gate-to-source voltage ($V_{GS}$) equal to zero volts, and PFET M9 is turned on, having its source-to-gate voltage ($V_{SG}$) equal to V(Vref). Activating transmission gate PFET M9 supplies the voltage at node Vref to node A2a, ensuring that NFET M11 is turned on. Activation of NFET M11 causes resistor R4 to be short-circuited and its resistance to be removed from the Slew Rate Detector 810 total resistance.

In the example provided above, transistors M9 and M10 act as an analog multiplexer for selectively providing either the potential at node Vref or the ground potential to the gate of NFET M11, depending on the voltage value of configuration input A2. A similar explanation could be provided for NFET switch M14, which is controlled by configuration input A1 and the analog multiplexer formed with transistors M12 and M13 in FIG. 8.

In some embodiments, one or more transistors may also be coupled between the power supply bus (VCC) and a capacitor of the Slew Rate Detector 810 for adding or removing capacitance, and thus, modifying the RC time constant of the Slew Rate Detector. In the embodiment of FIG. 8, the source terminal of PMOS transistor M5 is coupled to the VCC bus, while its drain is coupled to capacitor C1. In addition, the source terminal of PMOS transistor M8 is coupled to the VCC bus, while its drain is coupled to capacitor C2.

In some cases, the gate terminal of transistor M5 may be coupled for receiving a configuration input (A3) from an internal or external source. Depending on the level of configuration input A3, transistor M5 may be activated to increase the RC time constant by providing a short-circuit between the VCC and capacitor C1, or deactivated to reduce the RC time constant by providing an open-circuit between the VCC bus and capacitor C1. Another configuration input (A4) could be supplied to PMOS transistor M8 to (a) active M8 to increase the RC time constant by providing a short-circuit between the VCC and capacitor C2, or (b) deactivate M8 to reduce the time constant by providing an open-circuit between the VCC bus and capacitor C2.

In other cases, the gate terminal of transistor M5 may be controlled by the output of an analog multiplexer implemented, e.g., with FET transistors M3 and M4. In the embodiment of FIG. 8, the gate terminal of transistor M5 is connected to the common drain terminals of transistors M3 and M4. The gate terminals of transistors M3, M4 are coupled for receiving a configuration input (A3) from an internal or external source. The source and body terminals of transistor M3 are connected to the VCC pin of the ESD trigger circuit, while the source and body terminals of transistor M4 are connected to node Vref and ground, respectively.

The reference voltage supplied to node Vref is usually chosen so that NFET M4 will act as an open transmission gate for the reference voltage during normal operational modes of the integrated circuit (i.e., when the VCC pin voltage relative to ground is equal, or at least close, to the chip power supply voltage, and when configuration input A3 is at or near the VCC pin voltage). In some cases, the reference voltage may be obtained from an on-chip or off-chip voltage divider. For example, a voltage divider may be configured to provide a reference voltage, which is equal to about half of the external power supply voltage (e.g., VCC/2) provided to the integrated circuit.

As noted above, the voltage value at node Vref may vary during ESD events. This condition usually occurs within the first 10 ns after the ESD event, when the voltage on the zapped pin and the voltage on the VCC bus rise to peak voltage values (typically in the 7-8V range). If this occurs, the analog multiplexer formed with FETs M3 and M14 will function correctly only if the voltage between nodes VCC and Vref is larger than the absolute values of a PFET (or NFET) threshold voltage. The condition V(VCC,Vref)>|Vth| (NFET or PFET) is implicitly assumed in the following explanation of RC time constant adjustments.

In the embodiment of FIG. 8, configuration inputs A3 and A4 are used for controlling the amount of capacitance, which is included within the RC time constant of Slew Rate Detector 810. For example, capacitor C1 can be added or removed from the RC time constant by setting configuration input A3 to one of two voltage values relative to ground: (a) the voltage value at the reference node (Vref), or (b) the voltage value at the power supply node (VCC). More specifically, capacitor C1 can be:

a) removed from the RC time constant by setting V(A3)=V (Vref). In doing so, PFET M3 is turned on and NFET M4 is turned off, having its source-to-gate voltage ($V_{SG}$) equal to zero volts. As a consequence, node A3a is pulled up to the VCC potential, ensuring that PFET M5 is turned off. Turning off PFET M5 ensures that the Slew Rate Detector 810 total capacitance does not include the capacitance value of C1.

b) added to the RC time constant by setting V(A3)=V (VCC). In doing so, NFET M4 is turned on, having its gate-to-source voltage ($V_{GS}$) equal to V(VCC, Vref), and PFET M3 is turned off, having its source-to-gate voltage ($V_{SG}$) equal to zero volts. Activating transmission gate NFET M4 supplies the voltage at node Vref to node A3a, ensuring that PFET M5 is turned on. This enables the capacitance value of C1 to be included within the total capacitance of Slew Rate Detector 810.

In the example provided above, transistors M3 and M4 act as an analog multiplexer for selectively providing either the potential at node Vref or the potential at node VCC to the gate of the PFET M5, depending on the voltage value of configuration input A3. A similar explanation could be provided for the PFET switch M8, which is controlled by configuration input A4 and the analog multiplexer formed with transistors M6 and M7 in FIG. 8.

In the embodiment of FIG. 8, a transistor (or set of transistors) may be coupled between the VSS bus and: (a) every resistor, (b) every N-number of resistors, or (c) as desired. In addition or alternatively, a transistor (or set of transistors) may be coupled between the VCC bus and: (a) every capacitor, (b) every N-number of capacitors, or (c) as desired. The number of transistors (or sets of transistors) used may ultimately depend on the desired level of programmability and the amount of space available within the ESD protection device.

As noted above, the transistor (or set of transistors) may be activated or deactivated by supplying a set of configuration inputs (e.g., A1, A2, A3 and A4) to their gate terminals. As described in more detail below, the configuration inputs may be digital, in some embodiments, and analog in others. In either embodiment, the configuration inputs A1, A2, A3 and A4 may be individually set to obtain the desired RC time constant.

The following description assumes that a set of transistors (e.g., M9, M10 and M11, as shown in FIG. 8) are coupled to at least one programmable node of the slew rate detector for altering the RC time constant. As used herein, a "programmable node" refers to a node, which is arranged between a programmable element (such as a fuse, transistor, etc.) and a resistor or capacitor of the Slew Rate Detector. A skilled artisan would readily understand how the following description could be modified if only one transistor (e.g., M11), or a substantially different arrangement of transistors, were coupled to the programmable node.

If a digital voltage signal is used, the set of transistors may operate similar to a switch by turning the transistors "fully-on" or "fully-off." For example, NMOS switches M11 and M14 can be turned "fully-on" by supplying a low logic state (e.g., VSS) to the gate terminals of analog switches M9/M10 and M12/M13. Doing so would cause transistors M10 and M13 to turn off, and allow transistors M9 and M12 to turn on, thereby pulling the gate terminal of transistors M11 and M14 up towards the reference voltage (Vref). This would reduce the RC time constant by removing resistors R2, R3 and R4 from the resistor string. On the other hand, NMOS switches M11 and M14 can be turned "fully-off" by supplying a high logic state (e.g., any voltage higher than VCC/2) to the gate terminals of analog switches M9/M10 and M12/M13. Doing so would cause transistors M9 and M12 to turn off, and allow transistors M10 and M13 to turn on, thereby pulling the gate terminal of transistors M11 and M14 down towards the ground supply voltage (VSS). This would increase (or maintain) the RC time constant by keeping resistors R2, R3 and R4 within the resistor string.

The RC time constant may be similarly increased by supplying a high logic state (e.g., VCC) to the gate terminals of analog switches M3/M4 and M6/M7. Doing so increases the RC time constant by turning PMOS switches M5 and M8 on and adding capacitance from the parallel C network. On the other hand, the RC time constant may be decreased by supplying a low logic state (e.g., VCC/2) to the gate terminals of analog switches M3/M4 and M6/M7. The low logic state decreases the RC time constant by turning PMOS switches M5 and M8 off to remove capacitance from the parallel C network.

If an analog voltage signal is used, the set of transistors may operate similar to a linear resistor by turning the transistors "partially-on" or "partially-off." For example, transistors M11 and M14 can be turned "partially-on" or "partially-off" by supplying variable voltage levels (A1 and A2) to the gate terminals of transistors M9/M10 and M12/M13. In other words, the level of voltage signals A1 and A2 may be varied to shift the operational mode of transistors M11 and M14 within the active and/or saturation regions of the I-V curve. Lower voltage levels may be used to reduce the RC time constant by decreasing the resistance of one or more resistors, without removing the resistors from the resistor string. Higher voltage levels may be used to obtain the opposite effect. Therefore, variable voltage levels may be obtained by utilizing variable resistors (e.g., a potentiometer) and variable capacitors (e.g., a varactor), in some cases. In other cases, the RC time constant may be similarly increased/decreased by supplying variable voltage signals (A3 and A4) to the gate terminals of transistors M3/M4 and M6/M7.

As noted above, the configuration inputs A1, A2, A3 and A4 may be individually set to obtain the desired RC time constant. In some cases, the configuration inputs may be hardwired at the time of manufacture. In other cases, the configuration inputs may be obtained from an internal source (e.g., an on-chip voltage divider or storage device) or from an external source (coupled, e.g., to an external pin of the integrated circuit). If a reference signal (Vref) is used, it too may be obtained from an internal or external source.

Figure 9:
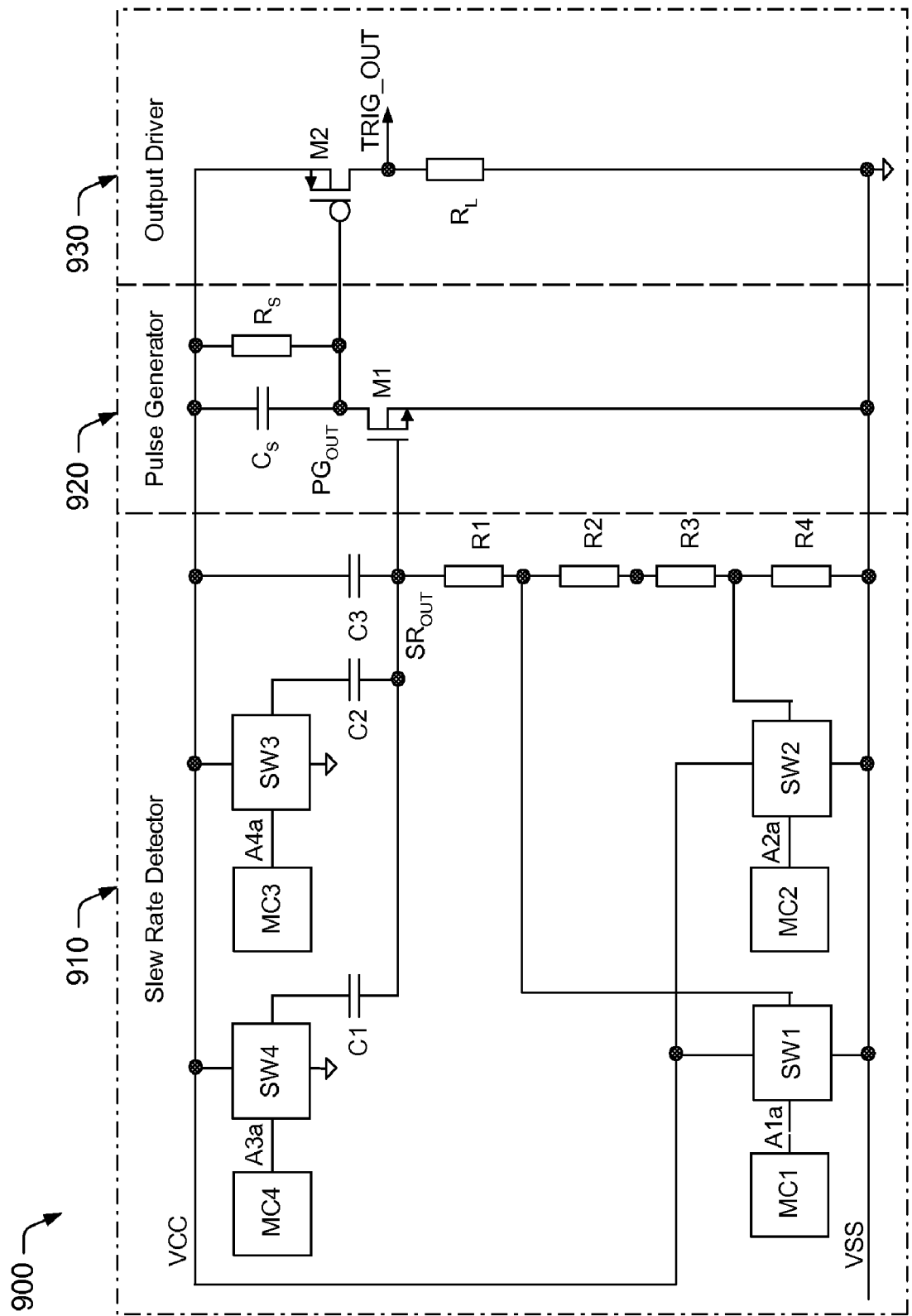
FIG. 9 is a simplified circuit diagram of yet another ESD trigger circuit that may be included within the ESD protection device of FIG. 2, according to yet another preferred embodiment of the invention.

FIG. 9 illustrates one embodiment in which configuration inputs A1, A2, A3 and A4 are obtained from an internal source. In some cases, trigger circuit 900 may be substantially identical to trigger circuit 800. For example, Slew Rate Detector 910 may include a plurality of resistors (R1, R2, R3, R4) and a plurality of capacitors (C1, C2, C3), as described above in reference to FIG. 8. In addition, Slew Rate Detector 910 may include a plurality of transistors, which are coupled to the programmable nodes of the Slew Rate Detector (as shown in FIG. 8) for altering the RC time constant associated therewith. In FIG. 9, the plurality of transistors are illustrated as switches SW1, SW2, SW3 and SW4. The plurality of transistors (contained within the switches) may be configured in a manner similar to, or altogether different from, the embodiment shown in FIG. 8. However, the principle operation of the transistors should remain relatively unchanged. In other words, digital configuration inputs (A1, A2, A3 and A4) may be supplied to the plurality of transistors within switches SW1, SW2, SW3 and SW4 for programmably altering an RC time constant of the slew rate detector.

FIG. 9 expands upon the concepts described in reference to FIG. 8 by providing an on-chip storage device for storing the digital configuration inputs (e.g., A1, A2, A3 and A4) used to control the plurality of transistors. The on-chip storage device is depicted in FIG. 9 as a plurality of memory cells (MC1, MC2, MC3 and MC4). The configuration inputs may be programmed within the memory cells by a manufacturer of the ESD protection device (once post-production test procedures confirm a desired RC time constant value) or by an end-user of ESD protection device anytime thereafter. Although the storage device may be implemented with substantially any type of memory, non-volatile memory cells (such as SONOS, Flash, SRAM, EEROM, EEPROM, etc.) may be preferred in some embodiments of the invention. In an alternative embodiment (not shown), the memory cells may be replaced with another type of storage device, such as MRAM, FRAM, PC memory cell. However, other types of storage devices may require more support circuitry, thus, increasing the cost of the device.

It is worth noting that FIGS. 8 and 9 illustrate only one manner in which a plurality of transistors may be used to implement a programmable means for altering an RC time constant of the slew rate detector. Alternative transistor configurations may be used in other embodiments of the invention.

Trigger circuits 800 and 900 provide many of the same advantages provided by trigger circuit 700. For example, trigger circuits 800 and 900 each provide a programmable means for altering the sensitivity of an ESD protection device without incurring the substantial cost and time associated with conventional trial-and-error post-production test procedures. In addition to the advantages provided above, trigger circuits 800 and 900 provide an easily re-programmable circuit, which can be altered at the package level. In some cases, trigger circuits 800 and 900 may be preferred over trigger circuit 700 when a means (such as a laser) for activating/deactivating the fuses is not available. On the other hand, trigger circuit 700 may be preferred, if reduced space consumption is valued over re-programmability, due to the slightly larger area consumed by trigger circuits 800 and 900.

Figure 10:
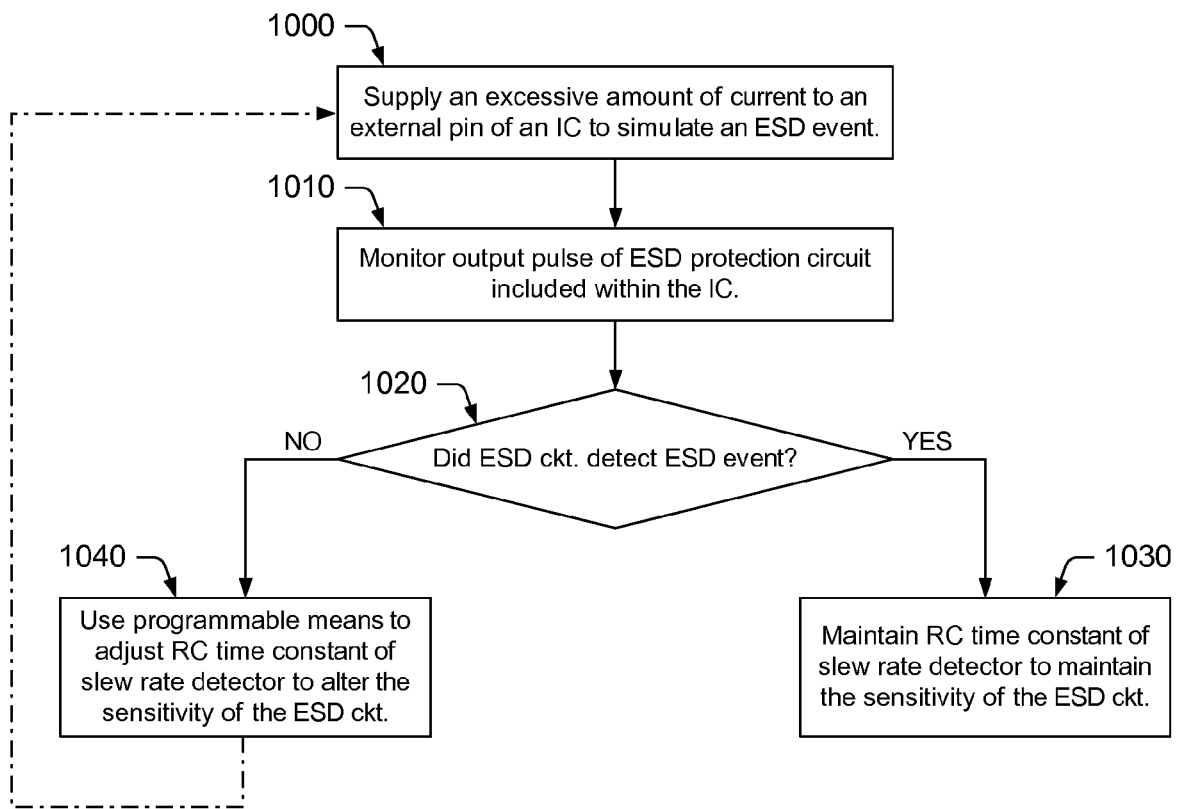
FIG. 10 is a flowchart diagram illustrating one embodiment of a method that may be used for programmably altering a sensitivity of the ESD protection device of FIG. 2.

One embodiment of a method that may be used for programmably altering the sensitivity of an ESD protection device is shown in FIG. 10. In general, the method may be performed after an ESD protection device is mounted on (or otherwise coupled to) an integrated circuit having components needing ESD protection. In some cases, the method may be performed by a manufacturer of the integrated circuit (or ESD protection device) before the integrated circuit is shipped to a user. In other cases, the method may be performed by an end-user of the integrated circuit. Regardless, the method may begin by supplying an excessive amount of ESD current to an external pin of the integrated circuit to simulate an ESD event (step 1000). As noted above, an "excessive" amount of ESD current may be described as a short pulse of current, which is large enough to inflict damage upon the sensitive circuitry requiring ESD protection. The excessive amount of current may be supplied to one or more input pins, output pins, input/output pins or power supply pins on the integrated circuit package. The ESD protection device may be similar to any of the embodiments described above in reference to FIGS. 2 and 7-9.

Once the excessive amount of current is applied to the external pin(s), an output pulse of the ESD protection device is monitored to test the sensitivity of the protection device (step 1010). If the output pulse indicates that the ESD event was successfully detected by the ESD protection device (step 1020), the sensitivity of the ESD protection device is maintained (step 1030) and no changes are made to the circuit. However, if the output pulse indicates that the ESD protection device did not detect the ESD event (step 1020), the sensitivity of the ESD protection device may be altered (step 1040) by using a variety of programmable elements to adjust the RC time constant of the slew rate detector contained therein. Any one of the programmable elements described in FIGS. 7-9 may be used to adjust the RC time constant. For example, one or more fuses included within the slew rate detector may be activated (or deactivated) to change the amount of resistance and/or capacitance included within the Slew Rate Detector output signal ($SR_{OUT}$). Instead of fuses, the RC time constant may be adjusted by changing the configuration inputs supplied to one or more transistors included within the Slew Rate Detector. As shown in FIGS. 7-9, the above-mentioned fuses and transistors may be coupled to programmable nodes within the Slew Rate Detector for effectuating the desired change.

Figure 4:
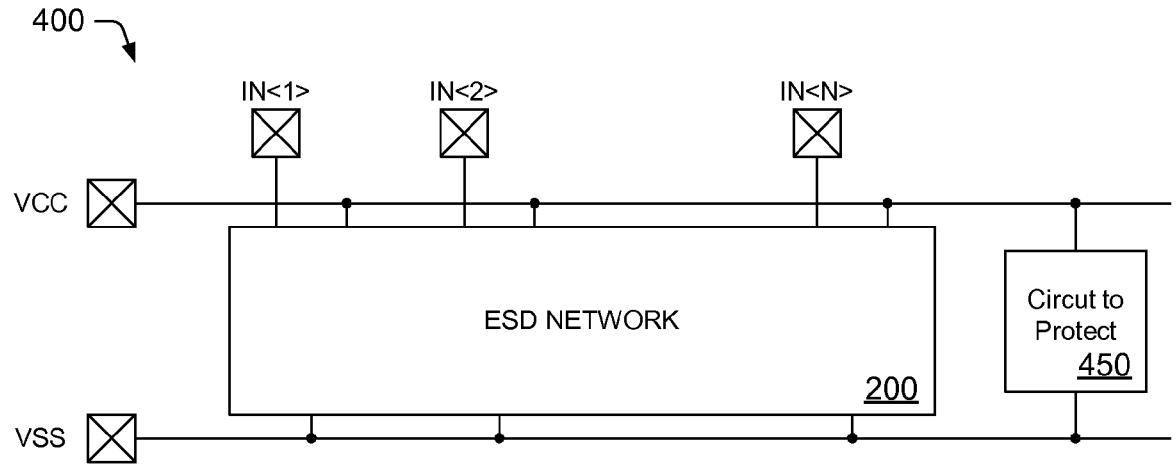
FIG. 4 is a block diagram illustrating one embodiment of an integrated circuit including a circuit component coupled between a power supply pin and a ground supply pin, and an ESD protection device coupled to input pins of the integrated circuit for protecting the circuit component from ESD charges supplied to the input pins.

In addition to an ESD protection device and method, an integrated circuit comprising an ESD protection device is also contemplated herein. FIGS. 4 and 5 illustrate various embodiments of an integrated circuit (400, 500) comprising an ESD protection device (200) and circuit components (450, 550) needing ESD protection. The ESD protection device may be similar to any of the embodiments described above in reference to FIGS. 2 and 7-9. In general, the ESD protection device may be coupled between a power supply bus (VCC) and a ground supply bus (VSS) for routing ESD current away from the sensitive IC components (450, 550) during an ESD event.

In one embodiment, the power supply and ground supply buses may be connected to external pins (VCC, VSS) of the integrated circuit for receiving power supply and ground supply voltages, respectively. For example, a relatively high voltage (e.g., about 5 volts) may be supplied to the power supply pin, while a relatively low voltage (e.g., about 0 volts) is supplied to the ground supply pin. However, because the designation of "high" and "low" supply voltages depends on several factors (such as process technology, availability of components, etc.), they are not limited to the few examples provided herein. In order to accommodate high ESD currents, the size of the power supply and ground supply buses may be chosen to minimize resistance and the resulting IR voltage drops along their length. In some cases, a dedicated ESD bus (not shown) may be included within the ESD protection circuit. In such cases, the size of the dedicated ESD bus may be somewhat smaller, due to the smaller ESD currents coupled onto this bus during ESD events. In one embodiment, the dedicated ESD bus may be a floating bus, internal to the integrated circuit, and not directly connected to external pins of the IC.

In some embodiments, the IC components (450) needing ESD protection may be coupled between the power supply and ground supply buses, as shown in FIG. 4. As such, the IC components may be configured for operating under the same supply voltages applied to the VCC and VSS pins. In other embodiments, the IC components (550) may be coupled for receiving a reduced power supply voltage (VPWR) from an internal power regulator (600), as shown in FIG. 5. For example, the internal power regulator may be coupled for receiving a relatively high voltage (e.g., about 5 volts) from the power supply bus. However, the IC components (550) may be configured for operating at substantially lower voltages (e.g., about 3.3 volts and below) than those initially supplied to a chip. For this reason, the internal power regulator may be used to generate a reduced power supply voltage, which is more suitable for the IC components (550). In some cases, the internal power regulator may be similar to the replica-biased regulator (600) shown in FIG. 6.

In some embodiments, the ESD protection device (200) may be coupled for protecting the IC components (450, 550) against ESD currents supplied to one or more input pins (e.g., IN<1>...IN<N>) of the integrated circuit, as shown in FIGS. 4 and 5. For example, excessive currents supplied to the input pin(s) may be detected by the ESD protection device and re-routed from the input pin(s) to ground (as described above in reference to FIG. 2) before the excessive currents reach the sensitive IC components. Although not shown in FIGS. 4 and 5, the ESD protection device could be additionally or alternatively coupled for protecting one or more output pins, input/output pins or power supply pins of the integrated circuit. All such modifications are considered to be contained herein.

It will be appreciated to those skilled in the art having the benefit of this disclosure that this invention is believed to provide an improved ESD protection device and method for programmably altering a sensitivity of the ESD protection device. More specifically, the invention provides a distributed active shunt ESD protection device with an improved trigger circuit design. The improved trigger circuit design includes a variety of programmable means (such as, a fuse, transistor, switch, etc.) for altering an RC time constant of a slew rate detector contained therein. The programmable means allow the RC time constant to be altered at the wafer or package level, and avoid the significant time and cost typically associated with conventional trial-and-error adjustment procedures.

Further modifications and alternative embodiments of various aspects of the invention will be apparent to those skilled in the art in view of this description. For example, although the improved trigger circuit design is incorporated within an ESD protection device, the improved design could be used within substantially any circuit providing threshold detection (such as, e.g., power-on reset circuits, interrupt circuits and circuits providing other logical and analog functions). It is intended, therefore, that the following claims be interpreted to embrace all such modifications and changes and, accordingly, the specification and drawings are to be regarded in an illustrative rather than a restrictive sense.

What is claimed is:

1. A device, comprising a trigger circuit coupled between a power supply bus and a ground supply bus for detecting an electrostatic discharge (ESD) event and activating a shunting device in response thereto, wherein the trigger circuit includes a slew rate detector having:
   a plurality of capacitors coupled in parallel between the power supply bus and an output node of the slew rate detector;
   a plurality of resistors coupled in series between the output node of the slew rate detector and the ground supply bus; and
   a programmable element adapted for changing a sensitivity at which the device senses an electrostatic discharge (ESD) applied to a circuit.

2. The device as recited in claim 1, further comprising:
   a plurality of diodes coupled between an input pin of the circuit and at least one of the power supply bus and the ground supply bus; and
   the shunting device coupled between the power supply bus and the ground supply bus for redirecting current away from the circuit during the ESD event.

3. The device as recited in claim 1, wherein the programmable element comprises at least one fuse coupled between the power supply bus and the plurality of capacitors for changing a capacitance applied to a voltage signal generated at the output node of the slew rate detector.

4. The device as recited in claim 3, wherein the programmable element additionally or alternatively comprises at least one fuse coupled between the ground supply bus and the plurality of resistors for changing a resistance applied to the voltage signal generated at the output node of the slew rate detector.

5. The device as recited in claim 4, wherein the at least one fuse is selected from a group comprising normally-open fuses and normally-closed fuses.

6. The device as recited in claim 1, wherein the programmable element comprises at least one transistor coupled between the power supply bus and the plurality of capacitors for changing a capacitance applied to a voltage signal generated at the output node of the slew rate detector.

7. The device as recited in claim 6, wherein the programmable element additionally or alternatively comprises at least one transistor coupled between the ground supply bus and the plurality of resistors for changing a resistance applied to the voltage signal generated at the output node of the slew rate detector.

8. The device as recited in claim 7, wherein the at least one transistor(s) is coupled for receiving:
   a first configuration input for removing resistance/capacitance from the voltage signal generated at the output node; and
   a second configuration input, of greater voltage than the first configuration input, for adding resistance/capacitance to the voltage signal generated at the output node.

9. The device as recited in claim 7, wherein the at least one transistor(s) is coupled for receiving a variable voltage level to add a variable amount of resistance/capacitance to the voltage signal generated at the output node.

10. The device as recited in claim 7, wherein the programmable element further comprises a storage device for storing a configuration input, which is supplied to the at least one transistor(s) for determining an amount of resistance/capacitance to be included within the voltage signal generated at the output node.

11. The device as recited in claim 10, wherein the storage device is selected from a group of non-volatile memory comprising Flash, SRAM, FRAM, MRAM, EEROM, EEPROM and SONOS memory cells.

12. The device as recited in claim 1, wherein the trigger circuit further comprises:
   a pulse generator coupled to the output node of the slew rate detector, wherein the pulse generator is configured for generating a first pulse, if a voltage signal generated at the output node is greater than or equal to a first threshold voltage;
   an output driver coupled to an output node of the pulse generator, wherein the output driver is configured for generating a second pulse, if a voltage level of the first pulse is greater than or equal to a second threshold voltage; and
   wherein, if generated, the second pulse is supplied to the shunting device for activating the shunting device and redirecting current away from the circuit during the ESD event.

13. An integrated circuit having circuit components that are susceptible to damage from electrostatic discharge (ESD), the integrated circuit comprising:
   a power supply bus coupled to a power supply pin for receiving a power supply voltage;
   a ground supply bus coupled to a ground supply pin for receiving a ground supply voltage;
   an ESD protection device coupled between the power supply and ground supply buses for redirecting ESD current away from the circuit components during an ESD event, wherein the ESD protection device comprises a trigger circuit coupled for detecting the ESD event and for activating a shunting device in response thereto, wherein the trigger circuit includes a slew rate detector having:
      a plurality of capacitors coupled in parallel between the power supply bus and an output node of the slew rate detector;
      a plurality of resistors coupled in series between the output node of the slew rate detector and the ground supply bus; and
      at least one programmable element coupled for changing an RC time constant of the slew rate detector to alter a sensitivity of the ESD protection device.

14. The integrated circuit as recited in claim 13, wherein the circuit components are connected between the power supply and ground supply buses for receiving the power supply and ground supply voltages.

15. The integrated circuit as recited in claim 13, wherein the circuit components are coupled for receiving a reduced power supply voltage generated by an internal power regulator, which is connected between the power supply and ground supply buses.

16. The integrated circuit as recited in claim 13, further comprising:
   one or more input pins, output pins or input/output (I/O) pins;
   wherein the ESD protection device is coupled between the circuit components and at least one pin of the power supply, ground supply, input, output and input/output pins; and
   wherein the ESD protection device is configured for detecting an amount of ESD current beyond a pre-determined quantity that is supplied to the at least one pin during the ESD event, and for re-routing the supplied current to the ground supply bus.

17. The integrated circuit as recited in claim 13, wherein the ESD protection device further comprises:
   a plurality of diodes coupled between the at least one pin and the power supply bus or the ground supply bus; and
   the shunting device coupled between the power supply bus and the ground supply bus for redirecting current away from the circuit components during the ESD event.

18. The integrated circuit as recited in claim 13, wherein the at least one programmable element is selected from a group comprising at least one fuse, at least one transistor controlled by an externally-provided configuration input, and at least one transistor controlled by a configuration input stored within a reprogrammable storage device.

19. The integrated circuit as recited in claim 18, wherein the at least one programmable element is coupled between the power supply bus and a capacitor of the slew rate detector for adding/removing capacitance to/from the RC time constant.

20. The integrated circuit as recited in claim 19, wherein the at least one programmable element is additionally or alternatively coupled between the ground supply bus and a resistor of the slew rate detector for adding/removing resistance to/from the RC time constant.

21. A method for programmably altering a sensitivity of an electrostatic discharge (ESD) protection device, the method comprising:
   supplying ESD current to an external pin of an integrated circuit comprising the ESD protection device to simulate an ESD event;

monitoring an output pulse of the ESD protection device; and programmably adjusting an RC time constant of the ESD protection device, if the output pulse indicates that the ESD protection device did not respond to the ESD event.

22. The method as recited in claim 21, wherein said programmably adjusting comprises blowing one or more fuses.

23. The method as recited in claim 21, wherein said programmably adjusting comprises changing configuration inputs supplied to one or more transistors within the ESD protection device.

24. The method as recited in claim 21, wherein said supplying, monitoring and programmably adjusting are performed by a manufacturer of the integrated circuit or ESD protection device.

25. The method as recited in claim 21, wherein said supplying, monitoring and programmably adjusting are performed by a purchaser of the integrated circuit or ESD protection device.

* * * * *